(12) United States Patent
Inoue et al.

(10) Patent No.: US 12,663,919 B2
(45) Date of Patent: Jun. 23, 2026

(54) DATA DISPLAY DEVICE AND MOLDING MACHINE

(71) Applicant: Toyo Machinery & Metal Co., LTD., Akashi (JP)

(72) Inventors: Makoto Inoue, Akashi (JP); Koji Taruya, Akashi (JP)

(73) Assignee: Toyo Machinery & Metal Co., LTD., Akashi (JP)

( * ) Notice: Subject to any disclaimer, the term of this patent is extended or adjusted under 35 U.S.C. 154(b) by 0 days.

(21) Appl. No.: 18/792,940

(22) Filed: Aug. 2, 2024

(65) Prior Publication Data

US 2025/0044927 A1 Feb. 6, 2025

(30) Foreign Application Priority Data

Aug. 3, 2023 (JP) .................................. 2023-126953

(51) Int. Cl.
*G06F 3/0485* (2022.01)
*G06F 3/14* (2006.01)

(52) U.S. Cl.
CPC .............. *G06F 3/0485* (2013.01); *G06F 3/14* (2013.01); *G06F 2203/04803* (2013.01)

(58) Field of Classification Search
CPC .................... G06F 3/0485; G06F 3/14; G06F 2203/04803; G06F 3/0482; G06F 9/451;

G05B 19/409; B29C 2045/7606; B29C 2945/76939; B29C 45/76; B29C 45/1774; B29C 45/766; B29C 2945/76434

See application file for complete search history.

(56) References Cited

U.S. PATENT DOCUMENTS

| | | | | |
|---|---|---|---|---|
| 10,338,771 B2 * | 7/2019 | Okochi | .................. | B22D 17/32 |
| 2014/0037779 A1 * | 2/2014 | Olaru | ...................... | B29C 45/76 |
| | | | | 425/135 |

FOREIGN PATENT DOCUMENTS

| | | |
|---|---|---|
| JP | 2014226890 A | 12/2014 |

* cited by examiner

*Primary Examiner* — Rodney Amadiz
(74) *Attorney, Agent, or Firm* — Maine Cernota & Curran

(57) ABSTRACT

A data display device and a molding machine are provided. A control unit displays a monitor screen. The monitor screen is capable of displaying a first data display section and a second data display section. In the first and second data display sections, a plurality of data sets are displayed in vertical alignment in chronological order, each of the data sets including a plurality of data items related to one molding operation displayed in a row. If a switch split-screen display button is touched while only the first data display section is displayed, the second data display section is displayed in vertical alignment with the first data display section. If the switch split-screen display button is touched while the first data display section and the second data display section are displayed, the second data display section is cleared and only the first data display section is displayed.

9 Claims, 10 Drawing Sheets

73a

| BASE TIME | NUMBER OF SHOTS | MEASURED DATA ITEM | | | | | | |
|---|---|---|---|---|---|---|---|---|
| | | 1 | 2 | 3 | 4 | 5 | 6 | ... |
| 12/20  08:41:47 | 6912 | 22.08 | 21.13 | 10.87 | 9.92 | 10.87 | 32.00 | ... |
| 12/20  08:41:39 | 6911 | 22.08 | 21.13 | 10.87 | 9.92 | 10.87 | 32.00 | ... |
| 12/20  08:41:31 | 6910 | 22.08 | 21.13 | 10.87 | 9.92 | 10.87 | 32.00 | ... |
| 12/20  08:41:24 | 6909 | 22.08 | 21.13 | 10.87 | 9.92 | 10.87 | 32.00 | ... |
| 12/20  08:41:15 | 6908 | 22.08 | 21.13 | 10.87 | 9.92 | 10.87 | 32.00 | ... |
| 12/20  08:41:07 | 6907 | 22.08 | 21.13 | 10.87 | 9.92 | 10.87 | 32.00 | ... |
| 12/20  08:40:59 | 6906 | 22.08 | 21.13 | 10.87 | 9.92 | 10.87 | 32.00 | ... |
| 12/20  08:40:52 | 6905 | 22.08 | 21.13 | 10.87 | 9.92 | 10.87 | 32.00 | ... |
| 12/20  08:40:44 | 6904 | 22.08 | 21.13 | 10.87 | 9.92 | 10.87 | 32.00 | ... |
| 12/20  08:40:36 | 6903 | 22.08 | 21.13 | 10.87 | 9.92 | 10.87 | 32.00 | ... |
| 12/20  08:40:28 | 6902 | 22.08 | 21.13 | 10.87 | 9.92 | 10.87 | 32.00 | ... |
| 12/20  08:40:20 | 6901 | 22.08 | 21.13 | 10.87 | 9.92 | 10.87 | 32.00 | ... |
| 12/20  08:40:12 | 6900 | 22.08 | 21.13 | 10.87 | 9.92 | 10.87 | 32.00 | ... |
| 12/20  08:40:04 | 6899 | 22.08 | 21.13 | 10.87 | 9.92 | 10.87 | 32.00 | ... |
| 12/20  08:39:56 | 6898 | 22.08 | 21.13 | 10.87 | 9.92 | 10.87 | 32.00 | ... |
| 12/20  08:39:48 | 6897 | 22.08 | 21.13 | 10.87 | 9.92 | 10.87 | 32.00 | ... |
| 12/20  08:39:40 | 6896 | 22.08 | 21.13 | 10.87 | 9.92 | 10.87 | 32.00 | ... |
| 12/20  08:39:32 | 6895 | 22.08 | 21.13 | 10.87 | 9.92 | 10.87 | 32.00 | ... |
| 12/20  08:39:24 | 6894 | 22.08 | 21.13 | 10.87 | 9.92 | 10.87 | 32.00 | ... |
| 12/20  08:39:16 | 6893 | 22.08 | 21.13 | 10.87 | 9.92 | 10.87 | 32.00 | ... |
| 12/20  08:39:08 | 6892 | 22.08 | 21.13 | 10.87 | 9.92 | 10.87 | 32.00 | ... |
| 12/20  08:39:00 | 6891 | 22.08 | 21.13 | 10.87 | 9.92 | 10.87 | 32.00 | ... |
| 12/20  08:38:52 | 6890 | 22.08 | 21.13 | 10.87 | 9.92 | 10.87 | 32.00 | ... |
| 12/20  08:38:45 | 6889 | 22.08 | 21.13 | 10.87 | 9.92 | 10.87 | 32.00 | ... |
| 12/20  08:38:36 | 6888 | 22.08 | 21.13 | 10.87 | 9.92 | 10.87 | 32.00 | ... |
| 12/20  08:38:29 | 6887 | 22.08 | 21.13 | 10.87 | 9.92 | 10.87 | 32.00 | ... |
| 12/20  08:38:21 | 6886 | 22.08 | 21.13 | 10.87 | 9.92 | 10.87 | 32.00 | ... |
| 12/20  08:38:13 | 6885 | 22.08 | 21.13 | 10.87 | 9.92 | 10.87 | 32.00 | ... |
| 12/20  08:38:05 | 6884 | 22.08 | 21.13 | 10.87 | 9.92 | 10.87 | 32.00 | ... |
| 12/20  08:37:57 | 6883 | 22.08 | 21.13 | 10.87 | 9.92 | 10.87 | 32.00 | ... |
| 12/20  08:37:49 | 6882 | 22.08 | 21.13 | 10.87 | 9.92 | 10.87 | 32.00 | ... |
| : | : | : | : | : | : | : | : | : |

FIG. 3

MONITOR ITEM

Gn — Gn1 — Gn2

MONITOR ITEM TABLE

| # | Item | # | Item | # | Item | # | Item |
|---|---|---|---|---|---|---|---|
| 1 | V-P SWITCHING POSITION | 2 | CUSHION POSITION | 3 | STROKE MONITOR MAX | 4 | STROKE MONITOR DURING FILLING |
| 5 | STROKE MONITOR INJECTION COMPLETED | 6 | PLASTICIZATION COMPLETED POSITION | 8 | CYCLE TIMER | 9 | PRIMARY INJECTION TIME |
| 10 | PLASTICIZATION TIME | 11 | SUCK BACK TIME | 12 | OPENING TIME | 13 | CLOSING TIME |
| 14 | EJECTION TIME | 15 | FIRST SPEED | 16 | SECOND SPEED | 17 | THIRD SPEED |
| 25 | PRIMARY PRESSURE | 26 | SECONDARY PRESSURE | 27 | THIRD PRESSURE | 44 | PRESSURE 1 (POSITION 1) |
| 45 | SPEED 1 (POSITION 1) | 46 | PRESSURE 2 (POSITION 2) | 47 | SPEED 2 (POSITION 2) | 48 | PRESSURE 3 (TIME 1) |
| 49 | SPEED 3 (TIME 1) | 50 | PRESSURE 4 (TIME 2) | 51 | SPEED 4 (TIME 2) | 52 | INJECTION PRESSURE RISE TIME |
| 53 | MAXIMUM PRESSURE | 55 | MAXIMUM SPEED | 57 | ROTATIONAL SPEED 1 | 58 | ROTATIONAL SPEED 2 |
| 59 | ROTATIONAL SPEED 3 | 63 | PLASTICIZATION: AMOUNT OF ROTATION 1 | 64 | PLASTICIZATION: AMOUNT OF ROTATION 2 | 65 | PLASTICIZATION: AMOUNT OF ROTATION 3 |
| 69 | PLASTICIZATION: BACK PRESSURE 1 | 70 | PLASTICIZATION: BACK PRESSURE 2 | 71 | PLASTICIZATION: BACK PRESSURE 3 | 75 | PLASTICIZATION: TOTAL AMOUNT OF ROTATION |
| 76 | HEATER 1 TEMPERATURE | 77 | HEATER 2 TEMPERATURE | 78 | HEATER 3 TEMPERATURE | 79 | HEATER 4 TEMPERATURE |
| 80 | HEATER 5 TEMPERATURE | 81 | HEATER 6 TEMPERATURE | 82 | BOTTOM-HOPPER TEMPERATURE | 83 | MOLD TEMPERATURE 1 |
| 84 | MOLD TEMPERATURE 2 | 85 | MOLD TEMPERATURE 3 | 94 | RECLAMPING POSITION | 95 | AMOUNT OF OPENING |
| 96 | RECLAMPING TIME | 97 | INJECTION RESIDUAL PRESSURE (INJECTION START) | 98 | INJECTION RESIDUAL PRESSURE (INJECTION END) | 99 | BACK PRESSURE (PLASTICIZATION COMPLETED) |
| 100 | COMPRESSION POSITION 1 | 105 | CLAMPING FORCE (INJECTION START) | 106 | CLAMPING FORCE (INJECTION END) | 111 | SECONDARY PRESSURE DWELL POSITION |

SELECTED MONITOR ITEM

| Slot | Value | Slot | Value |
|---|---|---|---|
| 1 | 1 | 17 | 25 |
| 2 | 2 | 18 | 26 |
| 3 | 3 | 19 | 27 |
| 4 | 4 | 20 | 57 |
| 5 | 5 | 21 | 58 |
| 6 | 6 | 22 | 75 |
| 7 | 219 | 23 | 76 |
| 8 | 53 | 24 | 77 |
| 9 | 9 | 25 | 78 |
| 10 | 10 | 26 | 79 |
| 11 | 11 | 27 | 80 |
| 12 | 12 | 28 | 82 |
| 13 | 13 | 29 | 100 |
| 14 | 14 | 30 | 105 |
| 15 | 15 | 31 | 106 |
| 16 | 8 | 32 | 0 |

FIG. 4

DATA DISPLAY DEVICE AND MOLDING MACHINE

RELATED APPLICATIONS

This application claims priority to JP Patent Application No. 2023-126953 filed Aug. 3, 2023. This application is herein incorporated by reference, in its entirety, for all purposes.

BACKGROUND OF THE INVENTION

Field of the Invention

The present invention relates to a data display device for displaying data related to molding operations and a molding machine having the same.

Description of the Related Art

PTL 1 discloses an example of a molding machine in the past. This molding machine has a monitor screen to display data obtained in molding operations. The monitor screen displays a data set including a plurality of data items obtained in one molding operation in a row and vertically displays a plurality of data sets in chronological order. An operator looks at the data displayed on the monitor screen to check the operating state of the molding machine.

Patent Literature (PTL) 1 refers to JP 2014-226890 A.

SUMMARY OF THE INVENTION

The operator sometimes compares data related to one of the molding operations with data related to another molding operation in the monitor screen. If the data is close to each other allowing display in one screen, the operator can relatively readily compare. However, if the data is apart from each other not allowing display in one screen, the operator has to compare by vertical scrolling.

Accordingly, one or more embodiments of the present disclosure provide a data display device and a molding machine that facilitate comparison of a plurality of data items related to molding operations.

A data display device according to one or more embodiments of the present disclosure for displaying a plurality of data items related to one or more molding operations includes: a display device configured to display a monitor screen; and an input device configured to input an operation, wherein the monitor screen has a data display area capable of displaying a first data display section and a second data display section, in the first data display section and the second data display section, a plurality of data sets are displayed in vertical alignment in chronological order, each of the data sets including a plurality of data items related to one of the molding operations displayed in a row and, if a screen split operation is input to the input device while only the first data display section is displayed in the data display area, a vertical size of the first data display section is reduced and the second data display section is displayed in vertical alignment with the first data display section in the data display area, and, if a screen unsplit operation is input to the input device while the first data display section and the second data display section are displayed in the data display area, the second data display section is cleared to increase the vertical size of the first data display section.

According to the present invention, the monitor screen has the data display area capable of displaying the first data display section and the second data display section, and the first data display section and the second data display section are displayed in the data display area, each being capable of displaying the data sets including the plurality of data items related to molding operations. Thus, the first data display section displays the data set including a plurality of data items related to one of the molding operations, and the second data display section displays the data set including a plurality of data items related to another molding operation, and therefore an operator does not have to compare the data by vertical scrolling and is allowed to readily compare the data.

BRIEF DESCRIPTION OF THE DRAWINGS

FIG. 3 is a diagram illustrating one example of a plurality of data items related to molding operations stored in a storage device.

FIG. 4 is a diagram illustrating a monitor item selection screen.

DETAILED DESCRIPTION OF THE INVENTION

A description is given below to an injection molding machine according to one embodiment of the present invention with reference to FIGS. 1 through 10. The injection molding machine plasticizes a resin as a material for molded articles and injects into a cavity of a mold for molding the molded articles.

Figure 1:
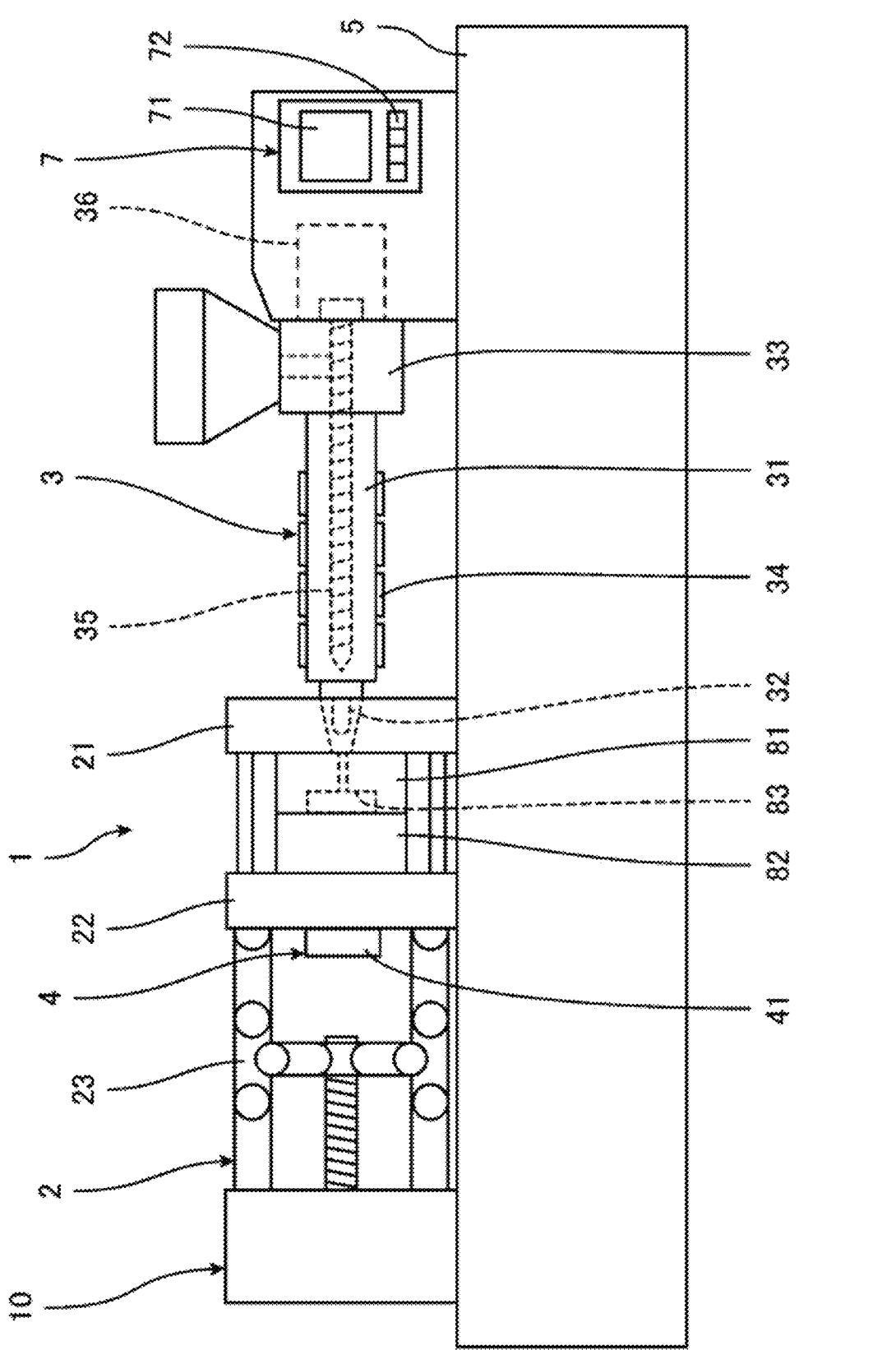
FIG. 1 is a diagram illustrating a schematic configuration of an injection molding machine according to one embodiment of the present invention.
Figure 2:
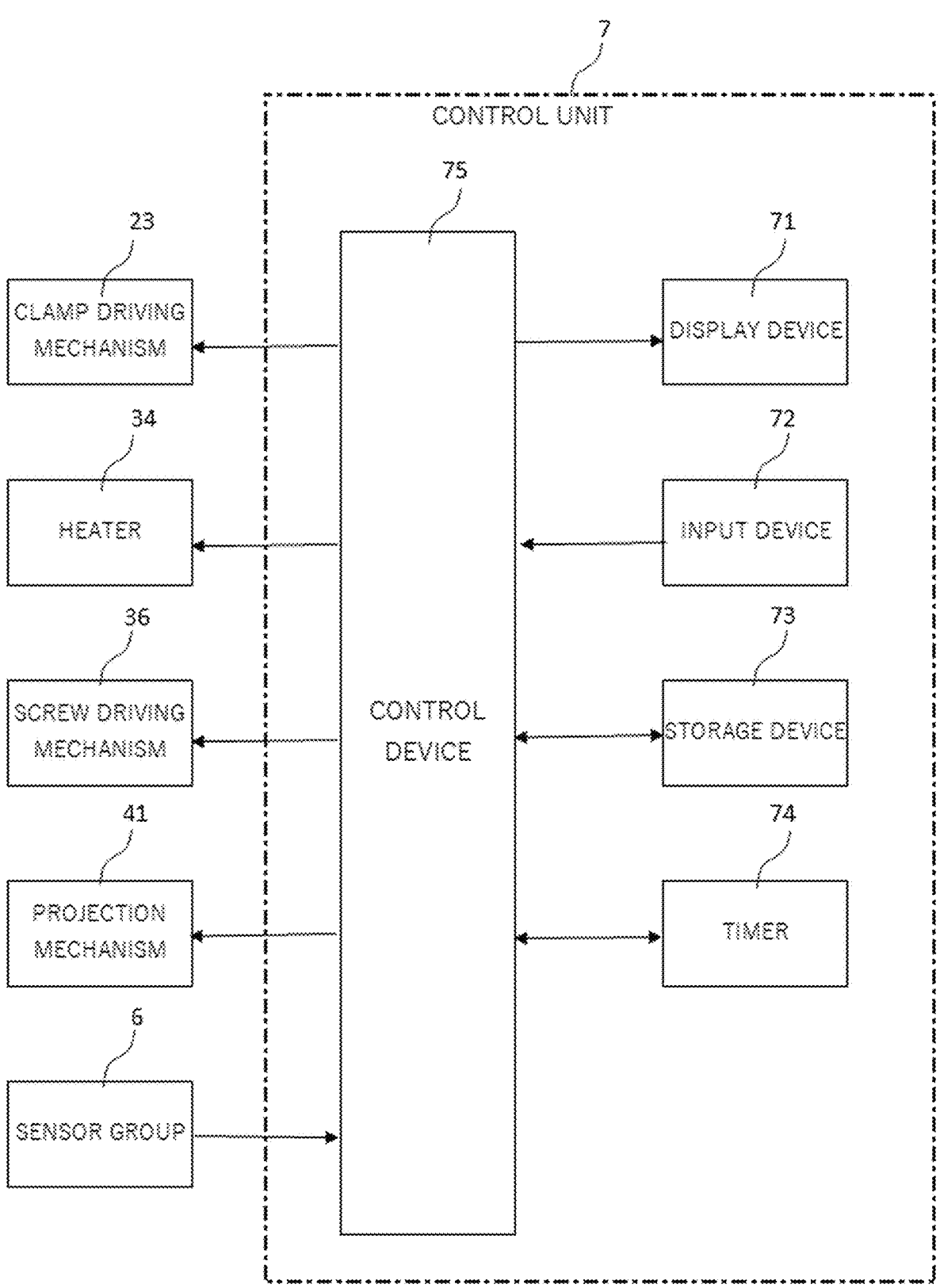
FIG. 2 is a functional block diagram of the injection molding machine.

FIG. 1 is a diagram illustrating a schematic configuration of an injection molding machine according to one embodiment of the present invention. FIG. 2 is a functional block diagram of the injection molding machine. FIG. 3 is a diagram illustrating one example of a plurality of data items related to molding operations stored in a storage device included in the injection molding machine. FIG. 4 is a diagram illustrating an example of a monitor item selection screen to select monitor items to be displayed on a monitor screen.

Figure 5:
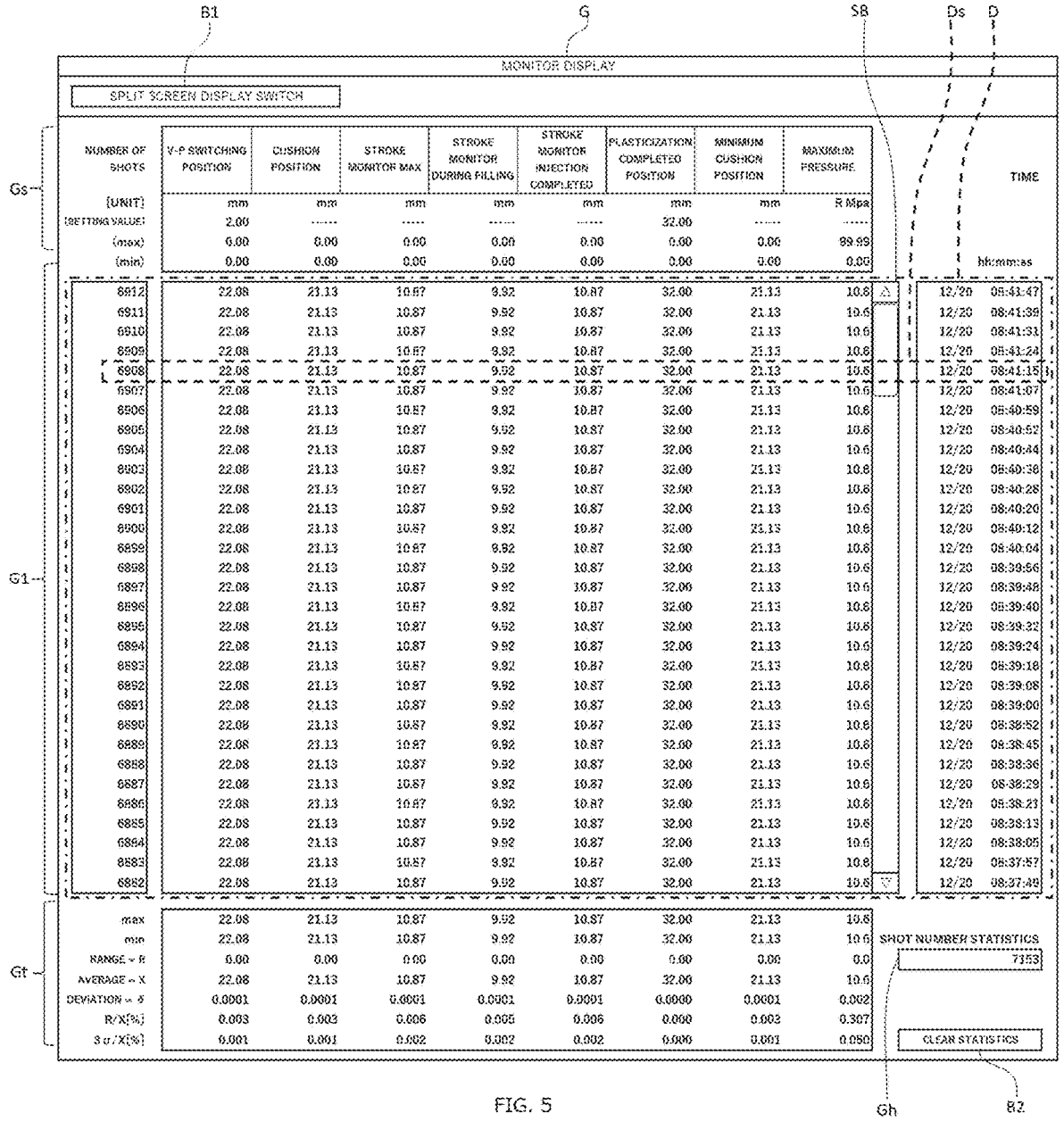
FIG. 5 is a diagram illustrating a first example of a monitor screen.
Figure 6:
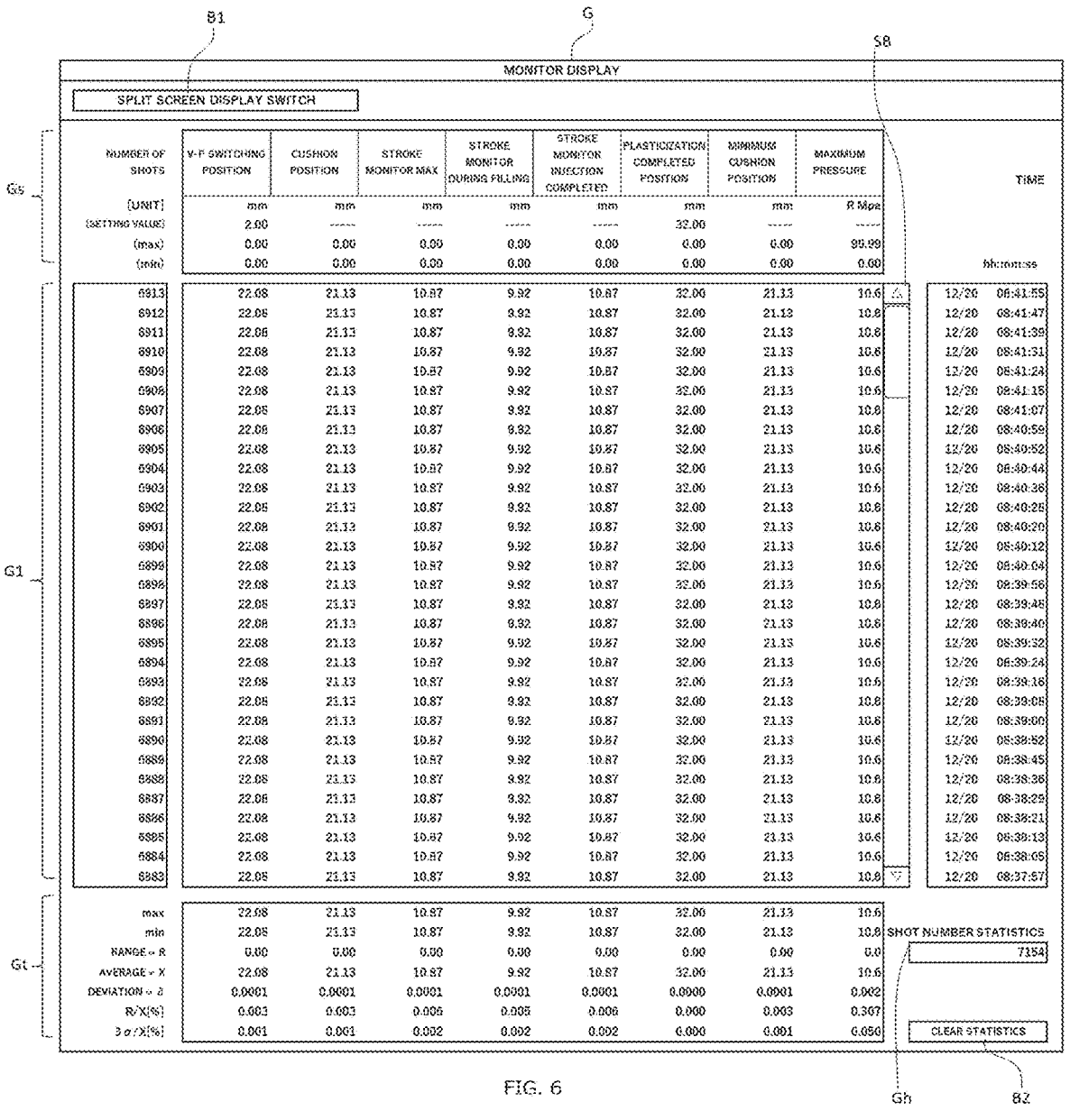
FIG. 6 is a diagram illustrating a second example of the monitor screen.
Figure 7:
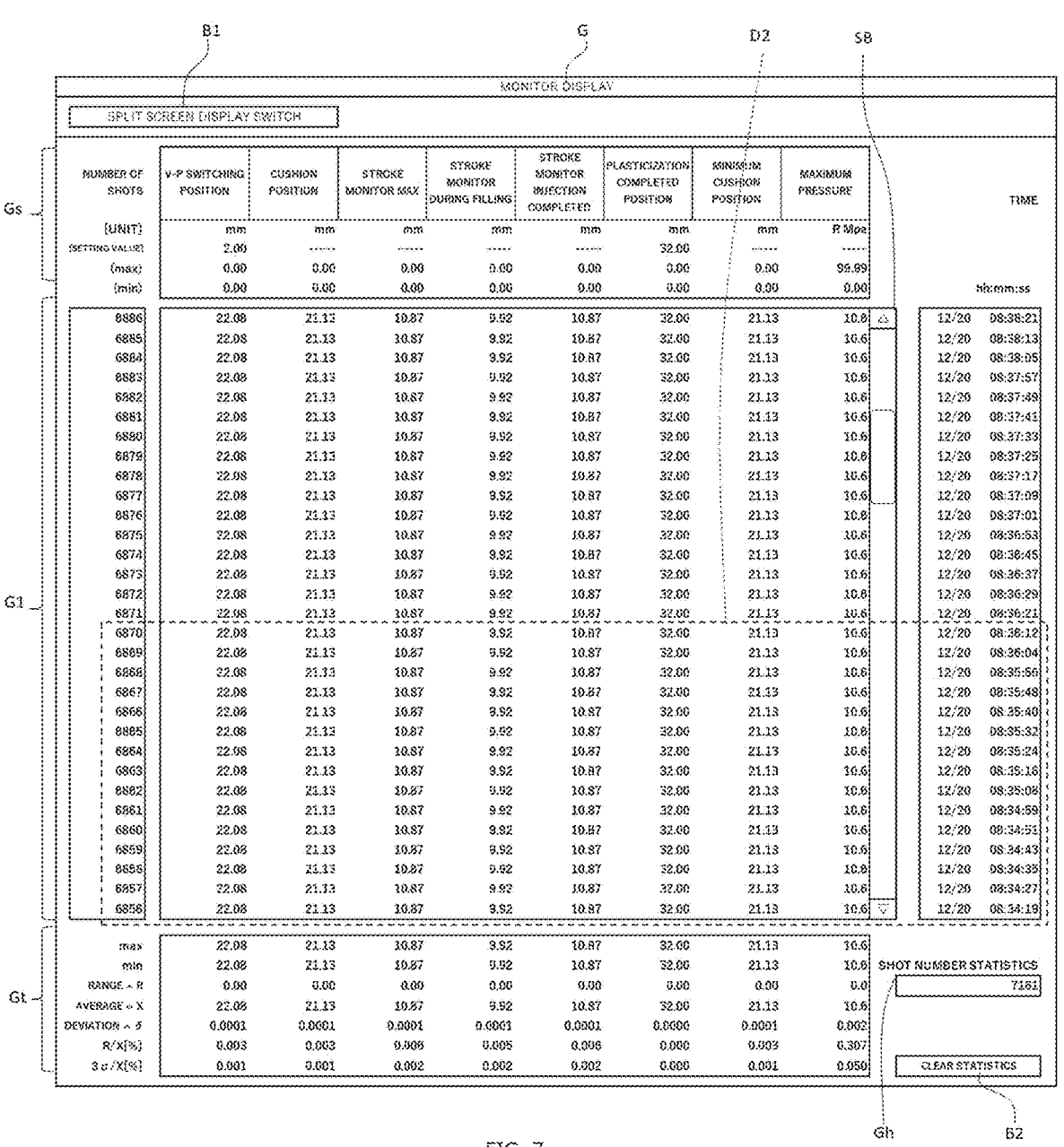
FIG. 7 is a diagram illustrating a third example of the monitor screen.
Figure 8:
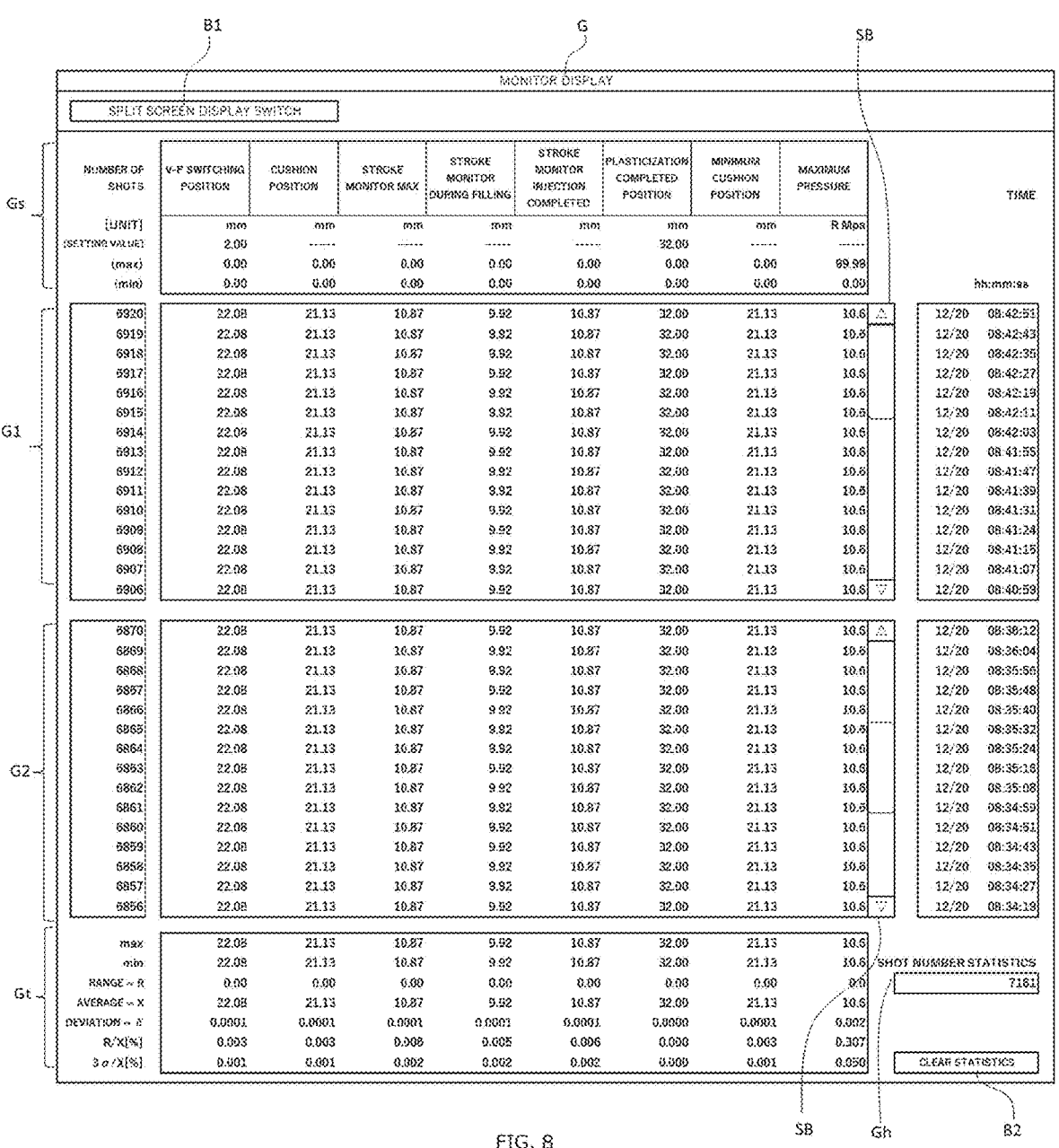
FIG. 8 is a diagram illustrating a fourth example of the monitor screen.
Figure 9:
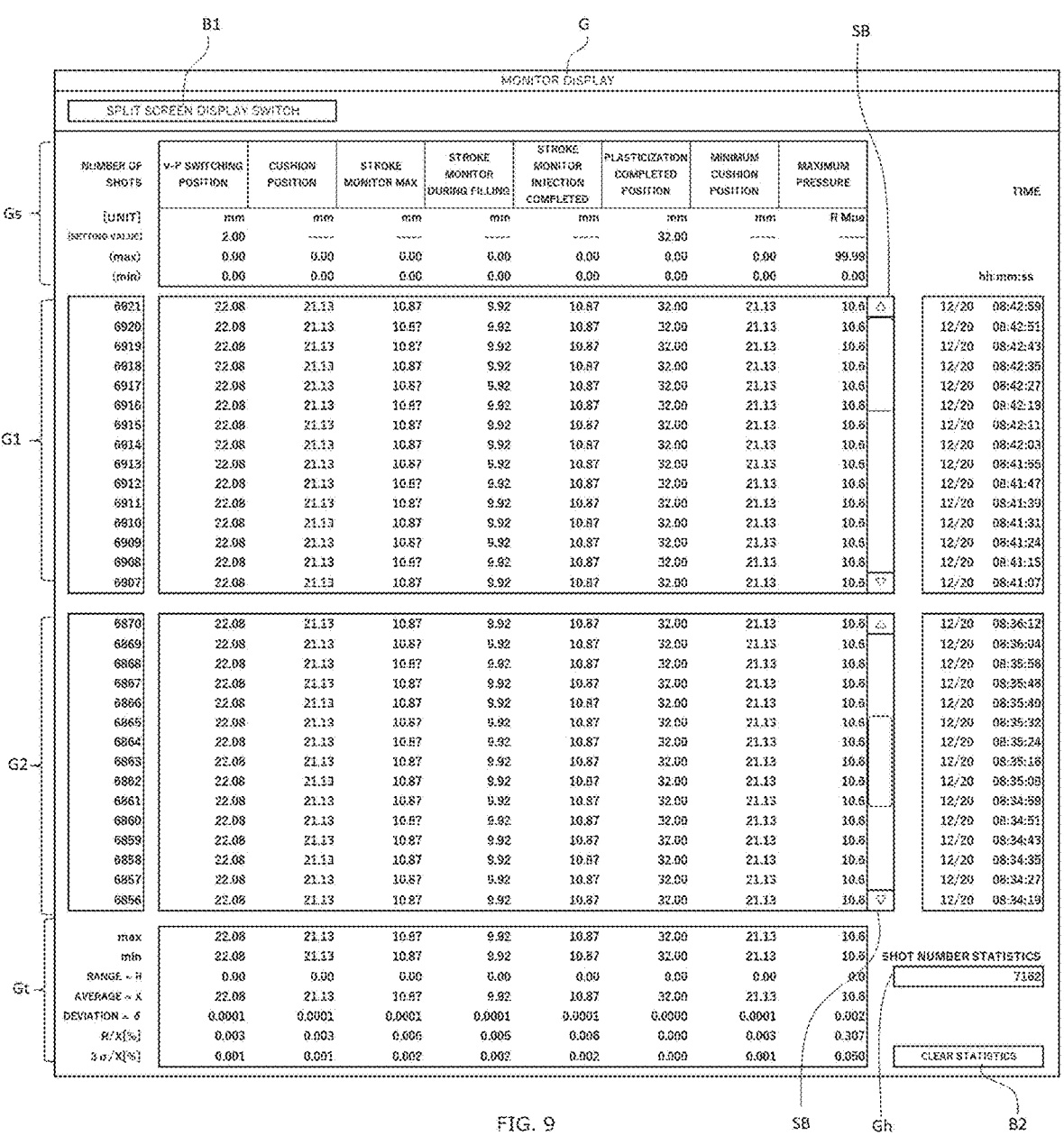
FIG. 9 is a diagram illustrating a fifth example of the monitor screen.
Figure 10:
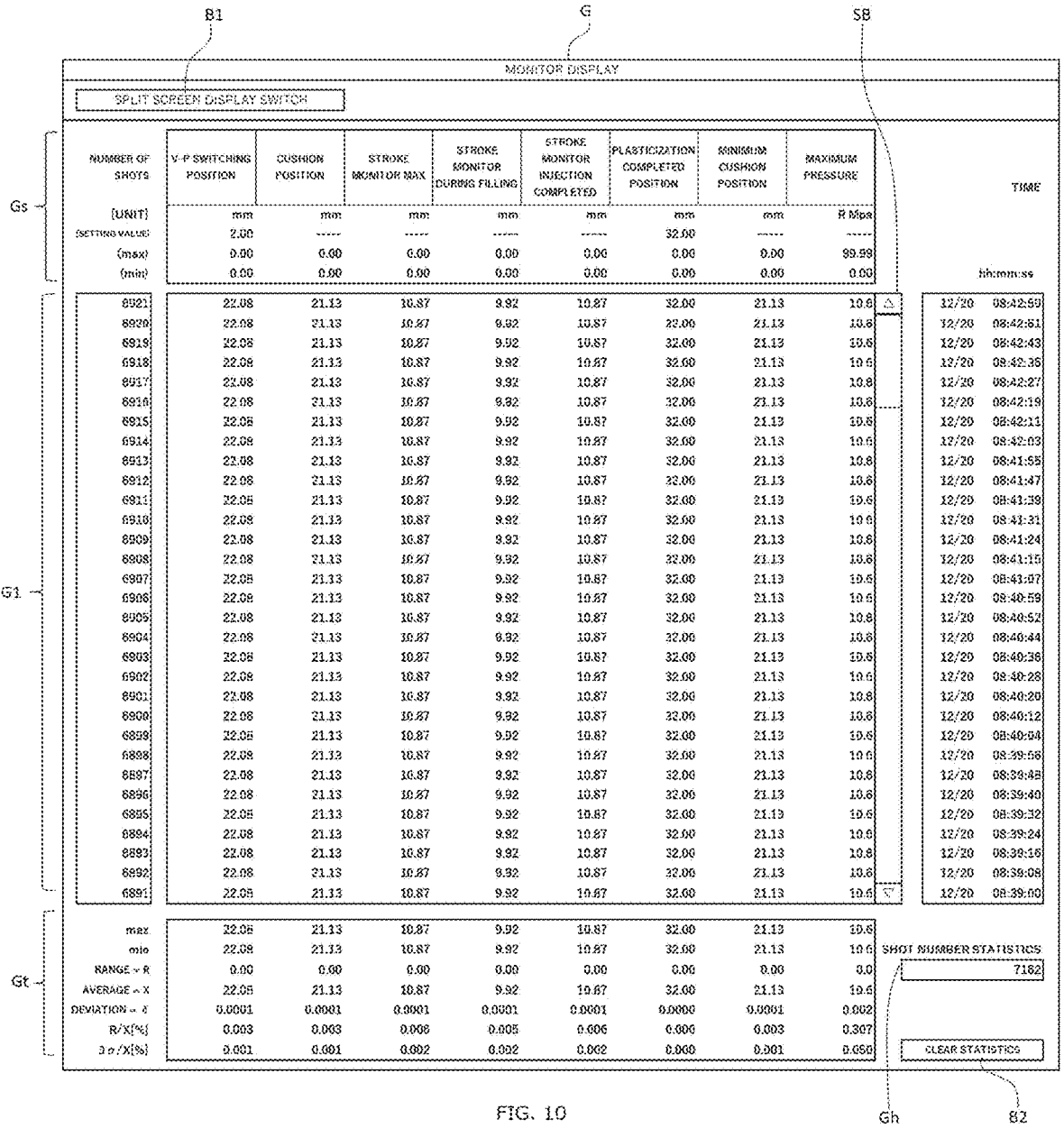
FIG. 10 is a diagram illustrating a sixth example of the monitor screen.

FIGS. 5 through 10 are diagrams illustrating examples of the monitor screen displayed during execution of molding operations. FIG. 5 illustrates the monitor screen while only a first data display section is displayed in the data display area. FIG. 6 illustrates the monitor screen when a new molding operation is executed while only the first data display section is displayed in the data display area. FIG. 7 illustrates the monitor screen when the first data display section is scrolled while only the first data display section is displayed in the data display area. FIG. 8 illustrates the monitor screen when a screen split operation is input while only the first data display section is displayed in the data display area. FIG. 9 illustrates the monitor screen when a new molding operation is executed while the first data display section and a second data display section are displayed in the data display area. FIG. 10 illustrates the monitor screen when a screen unsplit operation is input while the first data display section and the second data display section are displayed in the data display area.

As illustrated in FIG. 1, an injection molding machine 1 according to the present embodiment has a molding machine body 10 including a clamping device 2, an injection device 3, and an ejection device 4. The molding machine body 10 is arranged on a base 5. The injection molding machine 1 also has a sensor group 6 (FIG. 2) arranged in the molding machine body 10 and a control unit 7 to control the molding machine body 10.

The clamping device 2 opens, closes, and clamps a fixed-side mold 81 and a movable-side mold 82. The fixed-side mold 81 and the movable-side mold 82 form a cavity 83.

The clamping device 2 has a fixed die plate 21, a movable die plate 22, and a clamp driving mechanism 23. To the fixed die plate 21, the fixed-side mold 81 is attached. To the movable die plate 22, the movable-side mold 82 is attached. The clamp driving mechanism 23 has, for example, an electric motor, a ball screw mechanism, and a toggle link mechanism. The clamp driving mechanism 23 causes the fixed die plate 21 and the movable die plate 22 to clamp the fixed-side mold 81 and the movable-side mold 82 in a front-back direction (left-right direction in FIG. 1) and thus generates a clamping force.

The injection device 3 has a cylinder 31, a nozzle 32, a resin supply section 33, a heater 34, a screw 35, and a screw driving mechanism 36.

The cylinder 31 has a cylindrical shape. The cylinder 31 is arranged along the front-back direction. The nozzle 32 is arranged at a distal end of the cylinder 31. The resin supply section 33 is arranged at a rear end of the cylinder 31. The resin supply section 33 has a hopper to store a powder or granular resin as a material for molded articles. The resin supply section 33 supplies the resin to the cylinder 31. The heater 34 is, for example, a band heater and is arranged on an outer circumferential surface of the cylinder 31. The screw 35 is stored in the cylinder 31 rotatably and movably to the front and back. The screw driving mechanism 36 has, for example, an electric motor and a ball screw mechanism. The screw driving mechanism 36 causes the screw 35 to rotate and move forward and backward.

The ejection device 4 has an ejector pin, not shown, and a projection mechanism 41. The projection mechanism 41 has, for example, an air cylinder. The projection mechanism 41 drives the ejector pin to remove a molded article from the movable-side mold 82.

The sensor group 6 is configured with a plurality of sensors arranged in various portions of the molding machine body 10. The sensor group 6 includes, for example, sensors to detect the position and speed of the screw 35, a sensor to detect the rotational speed of the screw 35, sensors to detect the pressures (injection pressure, dwell pressure, back pressure) applied to the resin in the cylinder 31, a sensor to detect the amount of opening and closing of the mold, a sensor to detect the clamping pressure, a sensor to detect the pressure (internal mold pressure) applied to the resin in the cavity 83, a sensor to detect the amount of projection of the ejector pin, a sensor to detect the pressure applied to the ejector pin, sensors to detect temperatures in various portions of the molding machine body 10, a sensor to detect the power value, and the like.

The control unit 7 manages the entire operation of the injection molding machine 1. As illustrated in FIG. 2, the control unit 7 has a display device 71, an input device 72, a storage device 73, a timer 74, and a control device 75. The control unit 7 is a data display device for displaying a plurality of data items related to the operation of molding a molded article (molding operation).

The display device 71 is, for example, a flat panel display, such as a liquid crystal display.

The input device 72 is, for example, an operation key and a touchscreen. The operation key is, for example, keys of a hardware keyboard. The touchscreen is arranged over a display surface of the display device 71 to configure software keys in combination with button graphics, scroll bar graphics, and the like displayed on the display surface. Touching an area corresponding to one of the button graphics on the touchscreen or sliding one of the scroll bar graphics is equivalent to operating one of the software key, that is, inputting an operation to the input device 72.

The storage device 73 is, for example, a magnetic disk device, a non-volatile memory, or the like. The storage device 73 holds information on molding conditions and the like. The storage device 73 also holds data measured by the sensor group 6.

The control device 75 has a computer. The control device 75 is communicably connected to the display device 71, the input device 72, the storage device 73, and the timer 74. The control device 75 causes various kinds of information to be displayed on the display device 71 to operate in accordance with the operation input to the input device 72. Note that the display device 71 and the input device 72 may be, for example, a tablet device, a laptop computer, or the like connected to the control device 75 by wireless communication. The control device 75 is also connected to the sensor group 6.

The control device 75 is communicably connected to the clamp driving mechanism 23, the heater 34, the screw driving mechanism 36, and the projection mechanism 41. The control device 75 controls, in the molding operation, the clamp driving mechanism 23, the heater 34, the screw driving mechanism 36, the projection mechanism 41, and the like.

An example of the molding operation executed by the control device 75 is then described.

The control device 75 controls the heater 34 to heat the cylinder 31 to a predetermined temperature. The control device 75 executes a purging operation and measurement of the resin for the first injection before executing the molding operation.

In the molding operation, the control device 75 controls the clamp driving mechanism 23 for clamping by pressing the movable-side mold 82 against the fixed-side mold 81 (closing operation). Then, the control device 75 controls the screw driving mechanism 36 to move the screw 35 forward (injection operation (filling)). Thus, the plasticized resin at a front end portion of the cylinder 31 is filled in the cavity 83. Then, the control device 75 controls the screw driving mechanism 36 to move the screw 35 forward and backward so as to apply a predetermined pressure (dwell pressure) to the resin in the cavity 83 (injection operation (dwell pressure)).

Then, the control device 75 controls the screw driving mechanism 36 and causes the screw 35 to move backward while rotating to supply (measure) the resin in the amount for one injection to the front end portion of the cylinder 31 (measurement operation). The measurement operation is also referred to as a plasticizing operation. In parallel with the measurement operation, the control device 75 waits for cooling and curing of the resin in the cavity 83 (cooling operation).

Then, when the cooling operation is finished, the control device 75 controls the clamp driving mechanism 23 to open the fixed-side mold 81 and the movable-side mold 82 (opening operation) and controls the projection mechanism 41 to eject the molded article from the cavity 83 by the ejector pin (ejection operation).

The process from the closing operation through the ejection operation is one molding operation. The control device 75 repeatedly executes the molding operation to produce molded articles. One such molding operation is also referred to as one shot.

The control device 75 measures a plurality of data items using the sensor group 6 and the timer 74 during execution of the molding operation. The control device 75 stores the plurality of data items measured in the one molding operation (plurality of measured data items) in a data storage area 73a of the storage device 73 in association with the number of shots and the base time of the molding operation. The plurality of measured data items include actual measurement data items measured using the sensor group 6 and time data items measured (through timekeeping) using the timer 74. The number of shots is incremented by 1 every time a molding operation is executed. The number of shots is the number of executed molding operations and is also a molding operation number indicating the order of the executed molding operation. The base time is, for example, the start time of the closing operation. The number of shots, the plurality of measured data items, and the base time are data items related to the molding operation. The control device 75 associates the plurality of data items related to the one molding operation with each other as one data set Ds and stores in the data storage area 73a in the order of the base time of each data set Ds (chronological order). The data storage area 73a is capable of storing the data sets Ds for predetermined molding operations (e.g., 100,000 molding operations). When the data storage area 73a is full, the control device 75 overwrites the oldest data set Ds with a new data set Ds.

FIG. 3 illustrates an example of the plurality of data items related to molding operations stored in the data storage area 73a. In FIG. 3, the plurality of data items included in a row configure one of the data sets Ds, and the data sets Ds are aligned in chronologically descending order of the base time from top to bottom. In FIG. 3, the measured data items are aligned in the order of monitor item number (described later) from left to right.

The control unit 7 has a monitor screen to display the plurality of data items related to the molding operations and a monitor item selection screen to select monitor items indicating kinds of data item to be displayed on the monitor screen. The control device 75 causes the monitor screen and the monitor item selection screen to be displayed on the display device 71. The monitor screen displays the data items corresponding to the monitor items selected in advance by an operator using the monitor item selection screen. During execution of any molding operation, the plurality of data items related to the molding operation are displayed on the monitor screen substantially in real time.

FIG. 4 illustrates an example of a monitor item selection screen Gn. The monitor item selection screen Gn includes a monitor item table Gn1 and selected monitor items Gn2. The monitor item table Gn1 displays a list of monitor items that the operator can select. In the monitor item table Gn1, each monitor item has a monitor item name and its number (monitor item number) displayed in alignment. In the selected monitor items Gn2, the monitor item numbers to be displayed on the monitor screen are set.

FIGS. 5 through 10 illustrate examples of a monitor screen G. The monitor screen G includes a setting display section Gs, a statistics display section Gt, a statistical shot number display section Gh, a first data display section G1, and a second data display section G2. The monitor screen G also includes a switch split-screen display button B1 and a clear statistics button B2 as software keys.

The setting display section Gs is arranged in an upper area of the monitor screen G. In the setting display section Gs, setting information according to the plurality of monitor items selected in advance is displayed. In the setting display section Gs, the "monitor item name", the "unit", the "setting value", "max", and "min" according to each monitor item are displayed in alignment in order from top to bottom. The "max" in the setting display section Gs is an upper limit in a normal range of data measured for each monitor item. The "min" in the setting display section Gs is a lower limit in the normal range of the data measured for each monitor item.

The statistics display section Gt is arranged in a lower area of the monitor screen G. In the statistics display section Gt, statistics information according to the plurality of monitor items selected in advance is displayed. In the statistics display section Gt, "max", "min", "range=R", "average=X", "deviation=σ", "R/X [%]", and "3σ/X [%]" according to each monitor item are displayed in alignment in order from top to bottom. The "max" in the statistics display section Gt is the maximum value of the data measured for each monitor item. The "min" in the statistics display section Gt is the minimum value of the data measured for each monitor item. The "range=R" is a value obtained by subtracting the "min" from the "max". The "average=X" is an average value of the data measured for each monitor item. The "deviation=σ" is a standard deviation of the data measured for each monitor item. The "R/X [%]" is a value obtained by dividing the "range=R" by the "average=X". The "3σ/X [%]" is a value obtained by dividing a threefold value of the standard deviation of the data measured for each monitor item by the "average=X".

The statistical shot number display section Gh is arranged to the right of the statistics display section Gt. In the statistical shot number display section Gh, the number of shots (the number of molding operations) used for the statistics is displayed.

The monitor screen G has a data display area D (the area surrounded by the dash-dotted line in FIG. 5) between the setting display section Gs and the statistics display section Gt. The data display area D can display the first data display section G1 and the second data display section G2. The monitor screen G has a single screen display state S1 in which only the first data display section G1 is displayed in the entire data display area D and a split screen display state S12 in which the first data display section G1 and the second data display section G2 are displayed in the data display area D.

The first data display section G1 is displayed in the data display area D. In the first data display section G1, a plurality of data items related to molding operations are displayed. In the first data display section G1, one data set Ds including the plurality of data items related to one of the molding operations (the plurality of data items surrounded by the broken line in FIG. 5) is displayed in a row. The one data set Ds includes the number of shots, a plurality of data items measured for a plurality of monitor items selected in advance (measured data items), and the base time of the molding operation and they are displayed in alignment in order from left to right in the first data display section G1. In addition, in the first data display section G1, a plurality of data sets Ds are displayed in the chronologically descending order of the base time from top to bottom. That is, the base time of a data set Ds displayed above is newer than that of a data set Ds displayed below. The first data display section G1 has a scroll bar SB as a software key and is configured to allow vertical scrolling of the plurality of data sets Ds. The plurality of data sets Ds displayed in the first data display section G1 are vertically scrolled in accordance with sliding of the scroll bar SB. Sliding of the scroll bar SB is equivalent to an operation of vertically scrolling the plurality of data sets Ds displayed in the first data display section G1. The plurality of data sets Ds displayed in the first data display section G1 may be configured to allow horizontal scrolling. In the first data display section G1, the measured data items outside the normal range are highlighted (provided that a value other than 0 is set to the "max" or "min" in the setting display section Gs). Note that, although the dash-dotted line indicating the data display area D and the broken line indicating the data set Ds are illustrated only in FIG. 5, the data display area D and the data set Ds are the same in FIGS. 6 through 10.

The second data display section G2 is displayed below the first data display section G1 in the data display area D. In the second data display section G2, a plurality of data items related to molding operations are displayed. The second data display section G2 has the same configuration as that of the first data display section G1 and thus a detailed description is omitted.

The switch split-screen display button B1 is arranged above the setting display section Gs in the monitor screen G.

If the switch split-screen display button B1 is touched in the single screen display state S1, the control device 75 causes the first data display section G1 and the second data display section G2 to be displayed in vertical alignment in the data display area D and to proceed to the split screen display state S12. Note that touching the switch split-screen display button B1 in the single screen display state S1 is equivalent to inputting a screen split operation to the input device 72.

If the switch split-screen display button B1 is touched in the split screen display state S12, the control device 75 clears the second data display section G2 and causes only the first data display section G1 to be displayed in the data display area D to proceed to the single screen display state S1. Touching the switch split-screen display button B1 in the split screen display state S12 is equivalent to inputting a screen unsplit operation to the input device 72.

The clear statistics button B2 is arranged to the right of the statistics display section Gt and below the statistical shot number display section Gh. If the clear statistics button B2 is touched, the number of shots is cleared to cause the statistical shot number display section Gh to be 0 and the statistics information of the statistics display section Gt to be reset.

Then, the monitor screen G displayed on the display device 71 during execution of molding operations by the control device 75 is described with reference to FIGS. 5 through 10.

The control device 75 continuously executes molding operations and measures a plurality of data items related to the molding operations to store them in the data storage area 73a of the storage device 73.

When an operator inputs an operation of displaying the monitor screen G to the input device 72 during execution of any of the molding operations, the control device 75 causes the monitor screen G to be displayed on the display device 71 (FIG. 5). In this case, the control device 75 causes only the first data display section G1 to be displayed in the data display area D (single screen display state S1). In addition, the control device 75 reads the data sets Ds from the data storage area 73a to arrange the data set Ds of the newest base time in the topmost row of the first data display section G1 and also to cause the plurality of data sets Ds to be displayed in alignment in the chronologically descending order of the base time from top to bottom in the first data display section G1.

When the currently executed molding operation is completed and a new data set Ds related to the molding operation is stored in the data storage area 73a, the control device 75 reads the new data set Ds from the data storage area 73a. The data set Ds read at this point is the newest data set Ds. Then, the control device 75 moves the plurality of data sets Ds displayed in the first data display section G1 to one row below, respectively, and also causes the new data set Ds read from the data storage area 73a to be displayed in the topmost row of the first data display section G1 (FIG. 6).

If an operator vertically slides the scroll bar SB in the first data display section G1, the control device 75 causes the plurality of data sets Ds displayed in the first data display section G1 to be vertically scrolled in accordance with the sliding (FIG. 7). As illustrated in FIG. 7, this sliding operation causes the data sets Ds including the plurality of data items related to relatively old molding operations to be displayed in the first data display section G1.

If an operator touches the switch split-screen display button B1 in the single screen display state S1, the control device 75 (A) moves the lower end of the first data display section G1 upward (around the vertical center of the data display area D) to reduce the vertical size of the first data display section G1 and causes the second data display section G2 with the same vertical size as that of the first data display section G1 to be displayed below the first data display section G1, (B) reads the data sets Ds from the data storage area 73a to arrange the newest data set Ds in the topmost row of the first data display section G1 and also cause the plurality of data sets Ds to be displayed in alignment in the chronologically descending order of the base time from top to bottom in the first data display section G1, and (C) reads the data sets Ds from the data storage area 73a to cause the plurality of data sets Ds displayed in the first data display section G1 immediately before the switch split-screen display button B1 is touched to be displayed in alignment in the chronologically descending order from top to bottom in the second data display section G2 (FIG. 8). Thus, the single screen display state S1 proceeds to the split screen display state S12.

At this point, the plurality of data sets Ds displayed in the second data display section G2 are the plurality of data sets Ds displayed in a position D2 (the area surrounded by the broken line in FIG. 7) corresponding to the second data display section G2 in the first data display section G1 immediately before the switch split-screen display button B1 is touched. In such a manner, the plurality of data sets Ds displayed in the first data display section G1 immediately before the switch split-screen display button B1 is touched are displayed in the second data display section G2 without changing the respective positions. This allows suppressing missing the data set Ds that the operator is paying attention to by a change in the positions of the data sets Ds. Note that, when the second data display section G2 is displayed, the control device 75 may cause the data sets Ds displayed in a position other than the position D2 in the first data display section G1 to be displayed in the second data display section G2.

If an operator vertically slides the scroll bar SB of the first data display section G1, the control device 75 causes the plurality of data sets Ds displayed in the first data display section G1 to be vertically scrolled in accordance with the sliding. If an operator vertically slides the scroll bar SB of the second data display section G2, the control device 75 causes the plurality of data sets Ds displayed in the second data display section G2 to be vertically scrolled in accordance with the sliding.

If the currently executed molding operation is completed in the split screen display state S12 and a new data set Ds related to the molding operation is stored in the data storage area 73a, the control device 75 (D) reads a second newest one of the data sets Ds next to the data set Ds displayed in the topmost row of the first data display section G1 from the data storage area 73a, (E) moves the plurality of data sets Ds displayed in the first data display section G1 to one row below respectively and also displays the data set Ds read from the data storage area 73a in the topmost row of the first data display section G1, and (F) maintains display of the plurality of data sets Ds in the second data display section G2 (FIG. 9).

Specifically, (i) if the currently executed molding operation is completed during display of the newest data set Ds in the topmost row of the first data display section G1 and a new data set Ds related to the molding operation is stored in the data storage area 73a, the control device 75 reads the new data set Ds from the data storage area 73a, and moves the plurality of data sets Ds displayed in the first data display section G1 to one row below respectively and also causes the new data set Ds read from the data storage area 73a to be displayed in the topmost row of the first data display section G1. The control device 75 maintains (does not change) display of the plurality of data sets Ds in the second data display section G2.

As another specific example, (ii) if the currently executed molding operation is completed during display of a data set Ds older than the newest data set Ds in the topmost row of the first data display section G1 and a new data set Ds related to the molding operation is stored in the data storage area 73a, the control device 75 reads a second newest one of the data sets Ds (target data set Dst) next to the old data set Ds displayed in the topmost row of the first data display section G1 from the data storage area 73a, and moves the plurality of data sets Ds displayed in the first data display section G1 to one row below respectively and also causes the target data set Dst read from the data storage area 73a to be displayed in the topmost row of the first data display section G1. The control device 75 maintains (does not change) display of the plurality of data sets Ds of the second data display section G2.

That is, the plurality of data sets Ds displayed in the first data display section G1 are automatically scrolled to one row below every time the currently executed molding operation is completed, and the plurality of data sets Ds displayed in the second data display section G2 do not change. Note that the control device 75 performs the operation according to the first data display section G1 described in (i), (ii) above in either state of the single screen display state S1 or the split screen display state S12.

If an operator touches the switch split-screen display button B1 in the split screen display state S12, the control device 75 (G) clears the second data display section G2 and moves the lower end of the first data display section G1 downward (to the lower end of the data display area D) to increase the vertical size of the first data display section G1 and (H) reads the data sets Ds from the data storage area 73a and arranges the newest data set Ds in the topmost row of the first data display section G1, and also causes the plurality of data sets Ds to be displayed in alignment in the chronologically descending order of the base time from top to bottom in the first data display section G1. Thus, the split screen display state S12 proceeds to the single screen display state S1. FIGS. 5 through 7 and FIG. 10 illustrate the monitor screen G in the single screen display state S1. FIGS. 8 and 9 illustrate the monitor screen G in the split screen display state S12.

The control device 75 updates the statistics information displayed in the statistics display section Gt and the number of shots displayed in the statistical shot number display section Gh every time the one currently executed molding operation is completed.

As described above, the injection molding machine 1 has the molding machine body 10 to mold molded articles and the control unit 7. The control unit 7 is a data display device to display a plurality of data items related to one or more molding operations. The control unit 7 has the display device 71 to display the monitor screen G, the input device 72 to input an operation by an operator, and the control device 75. The monitor screen G has the data display area D capable of displaying the first data display section G1 and the second data display section G2. In the first data display section G1 and the second data display section G2, a plurality of data sets Ds are displayed in vertical alignment in the chronological order, each of the data sets Ds including a plurality of data items related to one of the molding operations displayed in a row.

If the switch split-screen display button B1 is touched while only the first data display section G1 is displayed in the data display area D (in the single screen display state S1), the control device 75 reduces the vertical size of the first data display section G1 and causes the second data display section G2 to be displayed in vertical alignment with the first data display section G1 in the data display area D.

If the switch split-screen display button B1 is touched while the first data display section G1 and the second data display section G2 are displayed in the data display area D (in the split screen display state S12), the control device 75 clears the second data display section G2 and increases the vertical size of the first data display section G1.

Such a configuration allows display of the first data display section G1 and the second data display section G2 in the data display area D of the monitor screen G, each capable of displaying the data sets Ds including a plurality of data items related to molding operations. Thus, the data set Ds including a plurality of data items related to one molding operation is displayed in the first data display section G1 and the data set Ds including a plurality of data items related to another molding operation is displayed in the second data display section G2, and therefore an operator does not have to compare the data items by vertical scrolling and is allowed to readily compare these data items. Thus, comparison is performed without the complicated operation of comparing data items by vertical scrolling.

In addition, if the switch split-screen display button B1 is touched in the single screen display state S1, the control device 75 (A) moves the lower end of the first data display section G1 upward to reduce the vertical size of the first data display section G1 and causes the second data display section G2 to be displayed below the first data display section G1, (B) causes the plurality of data sets Ds to be displayed in alignment in the chronologically descending order from top to bottom in the first data display section G1 so as to arrange the newest data set Ds in a topmost row, and (C) causes the plurality of data sets Ds displayed in the first data display section G1 immediately before the switch split-screen display button B1 is touched to be displayed in alignment in the chronologically descending order from top to bottom in the second data display section G2. In such a manner, a plurality of data sets Ds including the newest data set Ds are displayed in the first data display section G1 immediately after the single screen display state S1 proceeds to the split screen display state S12, and the plurality of data sets Ds displayed in the first data display section G1 immediately before the proceeding are displayed in the second data display section G2. It is thus possible to readily compare the plurality of data sets Ds including the newest data set Ds with the plurality of data sets Ds displayed in the first data display section G1 immediately before the proceeding.

Still in addition, the plurality of data items related to a molding operation are stored in the storage device 73 (data storage area 73a). If a new one of the data sets Ds is stored in the storage device 73 in the split screen display state S12, the control device 75 (D) causes a second newest one of the data sets Ds next to the data set Ds displayed in the topmost row of the first data display section G1 to be read from the storage device 73, (E) moves the plurality of data sets Ds displayed in the first data display section G1 to one row below respectively and also causes the data set Ds read from the storage device 73 to be displayed in the topmost row of the first data display section G1, and (F) maintains display of the plurality of data sets Ds in the second data display section G2. In such a manner, the plurality of data sets Ds displayed in the first data display section G1 are automatically scrolled to one row below, respectively, every time the currently executed molding operation is completed, and the plurality of data sets Ds displayed in the second data display section G2 do not change. It is thus possible to compare the plurality of data sets Ds in an automatically updated display displayed in the first data display section G1 with the plurality of data sets Ds in an unchanged display displayed in the second data display section G2.

Still in addition, if the switch split-screen display button B1 is touched in the split screen display state S12, the control device 75 (G) clears the second data display section G2 and moves the lower end of the first data display section G1 downward to increase the vertical size of the first data display section G1 and (H) causes the plurality of data sets Ds to be displayed in alignment in the chronologically descending order from top to bottom in the first data display section G1 so as to arrange the newest data set Ds in the topmost row. In such a manner, the plurality of data sets Ds including the newest data set Ds are displayed in the first data display section G1 immediately after the split screen display state S12 proceeds to the single screen display state S1. It is thus possible to check the plurality of data sets Ds including the newest data set Ds immediately after the proceeding.

Still in addition, the first data display section G1 has the scroll bar SB to input an operation of vertically scrolling the plurality of data sets Ds displayed in the first data display section G1. The second data display section G2 has the scroll bar SB to input an operation of vertically scrolling the plurality of data sets Ds displayed in the second data display section G2. That is, the first data display section G1 and the second data display section G2 are configured to allow vertical scrolling of the plurality of data sets Ds. Such a configuration allows display of desired data sets Ds in the first data display section G1 and the second data display section G2 by vertically scrolling the plurality of data sets Ds.

Although the injection molding machine according to one embodiment of the present invention has been described herein, the present invention is not limited to the injection molding machine. Embodiments of the present invention are also applicable to other kinds of molding machine, such as a die casting machine.

The above description has been given to some embodiments of the present invention, but embodiments of the present invention are not limited to these examples. The scope of the present invention also includes the embodiments described above appropriately subjected to addition, cancellation, design change of any of the components by those skilled in the art and appropriate combinations of the features of the embodiments as long as not departing from the spirit of the present invention.

What is claimed is:

1. A data display device for displaying a plurality of data items related to one or more molding operations, comprising: a display device configured to display a monitor screen; an input device configured to input an operation; and a control device, wherein the monitor screen has a data display area capable of displaying a first data display section and a second data display section, in the first data display section and the second data display section, a plurality of data sets are displayed in vertical alignment in chronological order, each of the data sets including a plurality of data items related to one of the molding operations displayed in a row, the control device is configured to cause a vertical size of the first data display section to be reduced and the second data display section to be displayed in vertical alignment with the first data display section in the data display area if a screen split operation is input to the input device while only the first data display section is displayed in the data display area, and the control device is configured to cause the second data display section to be cleared to increase the vertical size of the first data display section if a screen unsplit operation is input to the input device while the first data display section and the second data display section are displayed in the data display area.

2. The data display device according to claim 1, wherein the first data display section is configured to allow vertical scrolling of the plurality of data sets displayed in the first data display section and the second data display section is configured to allow vertical scrolling of the plurality of data sets displayed in the second data display section.

3. The data display device according to claim 1, wherein, the control device is configured to, if the screen split operation is input to the input device while only the first data display section is displayed in the data display area, cause (A) a lower end of the first data display section to move upward to reduce the vertical size of the first data display section and to cause the second data display section to be displayed below the first data display section, (B) the plurality of data sets to be displayed in alignment in chronologically descending order from top to bottom in the first data display section so as to arrange the newest data set in a topmost row, and, (C) in the second data display section, the plurality of data sets displayed in the first data display section immediately before the screen split operation is input to be displayed in alignment in chronologically descending order from top to bottom.

4. The data display device according to claim 3, wherein the first data display section is configured to allow vertical scrolling of the plurality of data sets displayed in the first data display section and the second data display section is configured to allow vertical scrolling of the plurality of data sets displayed in the second data display section.

5. The data display device according to claim 3, wherein the plurality of data items related to the one or more molding operations are stored in a storage device and, the control device is configured to, if a new one of the data sets is stored in the storage device while the first data display section and the second data display section are displayed in the data display area, (D) read a second newest one of the data sets next to the data set displayed in the topmost row of the first data display section from the storage device, (E) move the data sets displayed in the first data display section to one row below respectively and also display the data set read from the storage device in the topmost row of the first data display section, and (F) maintain display of the data sets in the second data display section.

6. The data display device according to claim 3, wherein the control device is configured to, if the screen unsplit operation is input to the input device while the first data display section and the second data display section are displayed in the data display area, (G) clear the second data display section and moves the lower end of the first data display section downward to increase the vertical size of the first data display section and (H) cause the plurality of data sets to be displayed in alignment in the chronologically descending order from top to bottom in the first data display section so as to arrange the newest data set in the topmost row.

7. The data display device according to claim 3, wherein the plurality of data sets to be displayed in the second data display section are the plurality of data sets displayed in a position corresponding to the second data display section in the first data display section immediately before the screen split operation is input.

8. The data display device according to claim 7, wherein the plurality of data items related to the one or more molding operations are stored in a storage device and, the control device is configured to, if a new one of the data sets is stored in the storage device while the first data display section and the second data display section are displayed in the data display area, (D) read a second newest one of the data sets next to the data set displayed in the topmost row of the first data display section from the storage device, (E) move the data sets displayed in the first data display section to one row below respectively and also displays the data set read from the storage device in the topmost row of the first data display section, and (F) maintain display of the data sets in the second data display section.

9. A molding machine, comprising: a molding machine body for molding a molded article; and the data display device according to claim 1.

* * * * *